May 23, 1961  R. L. DAVIDSON  2,984,972
VARIABLE AREA NOZZLE ARRANGEMENT
Filed May 28, 1958
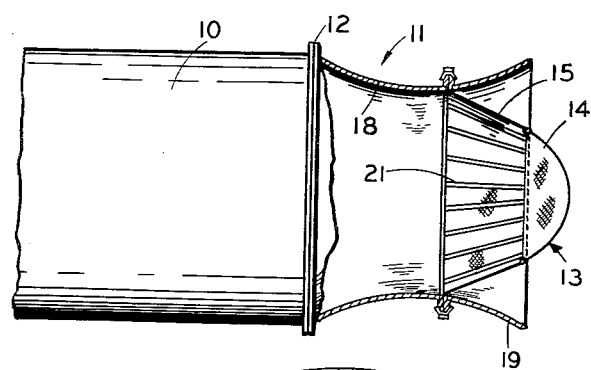
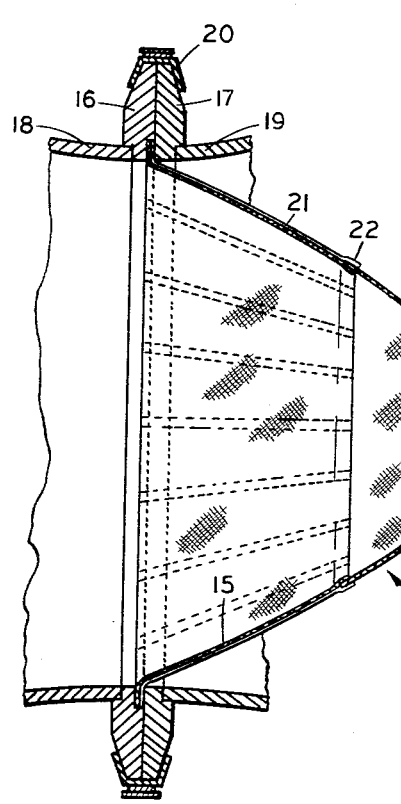
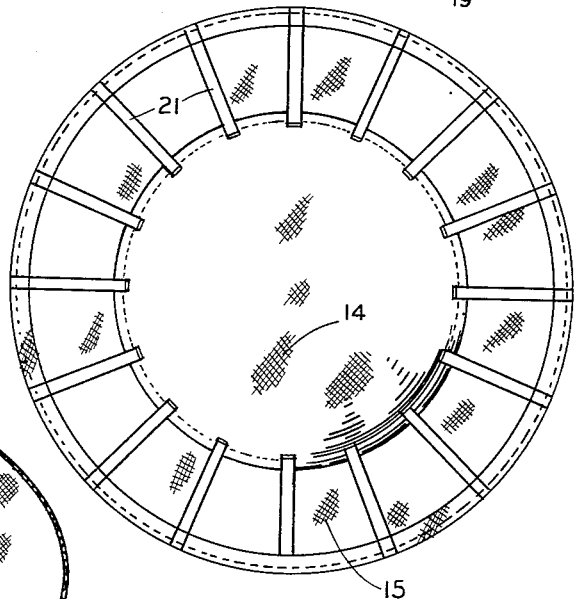
INVENTOR.
RALPH L. DAVIDSON
BY Lawrence G. Norris
ATTORNEY—

United States Patent Office 2,984,972
Patented May 23, 1961

2,984,972

VARIABLE AREA NOZZLE ARRANGEMENT

Ralph Lester Davidson, Lynnfield Center, Mass., assignor to General Electric Company, a corporation of New York Filed May 28, 1958, Ser. No. 738,381

2 Claims. (Cl. 60—35.6)

My invention relates to jet propulsion engines of the type which utilize the reactive force created by the expulsion of gases through a discharge nozzle and has particular application to jet discharge nozzles for such engines.

As is well know to those skilled in the art, the primary function of the jet nozzle in engines of the aforementioned type is to convert the energy stored in the gases being discharged from the potential to the kinetic form by expanding the gases from a high pressure, low velocity condition to a low pressure, high velocity condition so that a thrust reaction may be obtained from the high velocity expulsion of the gases from the nozzle. Thus, the efficiency of the nozzle is determined by the efficiency of conversion of the available energy in the gases from the potential to the kinetic form, any energy not so converted being unavailable for thrust reaction purposes. The effective throat area of the nozzle must therefore be sized in relation to the mass flow rate of gases through the nozzle and the pressure ratio across the nozzle such that complete and efficient expansion of the gases is obtained at the selected operating condition of the engine.

In view of the foregoing, it will be appreciated that in engines of the above type wherein thrust augmentation systems are employed, it is generally necessary or desirable from an operating efficiency standpoint to increase the effective area of the nozzle when the engine is operated in the thrust augmented condition. Such an increase in area is necessary in order to allow full expansion of the discharge gases at the considerably increased mass flow rates and reduced densities normally encountered with the engine afterburner in operation. In addition, it is usually necessary in such a thrust augmented engine to delay increasing the effective area of the nozzle relative to the initiation of afterburner operation until after sustained combustion in the afterburner has been established. By maintaining the smaller nozzle area, corresponding to normal engine operation, throughout the lighting-off phase of the afterburner, the conditions of temperature and pressure in the afterburner immediately upstream of the nozzle are caused to increase by reason of the flow restricting effect of the smaller nozzle area, thereby facilitating the initiation of sustained combustion in the afterburner. It is also necessary in some engine configurations to use a similar flow restricting arrangement to facilitate the normal starting of the engine. In the latter case, the nozzle area is reduced below that employed for normal operation to allow increased pressures and temperatures to be built up within the engine to facilitate the initiation of sustained combustion therein.

Variable area characteristics in jet discharge nozzles have generally been heretofore obtained by mechanically moving the elements of the nozzle forming the flow path. Thus, the throat portion of the nozzles has been generally formed of a series of separate elements capable of being moved radially inward and outward relative to the axis of the flow path to achieve variations in the nozzle effective area. Regardless of the particular configuration employed, however, I have found such arrangements to be relatively complex and expensive when considered for engines in which the application may require only a single sequencing of the engine through its various modes of operation during a complete mission. The type of cycle to which I refer is represented by one in which the engine is started, operated for a preselected time under normal conditions, and is then operated with afterburner thrust augmentation throughout the remainder of the operating cycle. It will be appreciated that in such a case it is necessary to increase the nozzle area only twice throughout the cycle, the first increase occurring after the engine has been started and the second after the afterburner operation has been initiated. It will be realized that in some cases it is unnecessary to provide a reduced nozzle area for starting purposes, and in those cases it is necessary to increase the nozzle area only after the afterburner is placed in operation.

Accordingly, it is one of the objects of my invention to provide a simple and inexpensive variable effective area nozzle for jet propulsion engines.

It is a further object of my invention to provide a variable effective area nozzle in which the effective area of the nozzle is caused to vary automatically in a single, preselected sequence in response to engine operating conditions and which is simple and reliable in operation and inexpensive to manufacture.

In satisfying these and other objects of my invention, I provide, in one embodiment thereof, a nozzle flow restrictor made up of a lattice network or mesh wire or rods relatively small cross section, the network being mounted in a suitable frame structure and extending across the flow path of the jet nozzle so as to be capable of restricting flow therethrough. The thermal mass, thermal conductivity and flow characteristics of the rods or wire strands are such that melting and disintegration of selected portions of the lattice occurs after exposure to preselected temperature and flow conditions for a preselected length of time, thus reducing the flow restriction represented by the lattice and increasing the effective area of the nozzle.

The latatice may be formed of two portions or sectors, the first melting and disintegrating under normal operating conditions to increase the effective nozzle area immediately after the starting of the engine and the second melting and disintegrating under conditions generated by afterburner operation to increase the effective nozzle area after sustained combustion in the afterburner has been established. It will be realized, of course, that in the event it is unnecessary to restrict the jet nozzle for purposes of starting the engine, only a single portion or sector need be provided for afterburner operation and that various types of materials and configurations may be employed to achieve any desired sequencing of effective nozzle area in response to temperature and flow conditions of the gases passing through the nozzle.

Other objects and advantages of my invention will be apparent from the following description taken in connection with the accompanying drawing, in which:

Fig. 1 is a fragmentary view of a jet engine showing the jet nozzle thereof in cross-section and embodying my invention:

Fig. 2 is an enlarged fragmentary, cross-sectional view of the jet nozzle of Fig. 1 showing the flow restrictor of Fig. 1 in greater detail; and Fig. 3 is an end view of the engine of Fig. 1.

Referring now to the illustration of Fig. 1, there is shown a jet engine 10 having a jet discharge nozzle 11 attached thereto through flange means 12 in any suitable manner, such as by means of bolts or the like, not shown. Mounted in the nozzle 11 and positioned in the fluid flow path thereof is a flow restricting member 13 which, in the embodiment shown, is formed of two portions or sectors 14 and 15 of wire or small diameter rods in the lattice or mesh form.

As illustrated in Fig. 2, the flow restricting member 13 is supported in the nozzle structure by being clamped between flanges 16 and 17 which are, in turn, welded or otherwise suitably secured to the portions 18 and 19 respectively of the discharge nozzle 11. The flanges 16 and 17 are held together in abutting relationship by means of a clamp 20 which may be of any well known type but preferably one which is easily and quickly attachable and removable to allow rapid installation and replacement of the flow restrictor 13. The sector 15 of the flow restrictor may be provided with suitable support members or stiffeners 21 which may be secured in any suitable manner to the sector 15, such as by means of brazing, spot welding or the like. As best shown in Fig. 2, the stiffeners 21 are bent outward slightly at their inner extremities 22 to form slots along the inner periphery of the outer flow restrictor sector 15 in which the outer edge of the sector 14 is secured by spot welding or in any other suitable manner.

The inner web sector 14 is formed of a network of small diameter rods or wires which are of a material which melts or which is substantially weakened at the temperature and flow conditions of the hot gas flowing through the nozzle 11 at the preselected engine condition at which an initial increase in the effective area of the discharge nozzle is desired, such as, for instance, the condition encountered immediately after the engine is started in the case where it is desired to initially restrict the effective jet nozzle area for starting purposes. In addition the thermal mass of the rods or wires forming the structure of the flow restrictor web sector 14 is such that upon exposure for a predetermined length of time to the hot gas flow conditions at the particular engine conditions selected the sector 14 melts or is weakened to the point where it disintegrates, thus increasing the effective area of the jet nozzle. It will be appreciated that the selection of the material, configuration and thermal capacity of the wires or rods forming the sector 13 depends upon the erosive characteristics of the hot gas stream corresponding to the particular engine conditions selected as well as upon the total or impact temperature of the hot gas flowing through the nozzle at the particular selected condition. Typical temperature ranges and hot gas flow conditions encountered under various engine operating conditions as well as examples of various materials suitable for application in the arrangement of my invention will be set forth below.

The outer sector 15 of the flow restrictor 13 is similarly formed of a mesh or lattice network of wires or rods formed of a material and of a configuration such as to allow melting or disintegration thereof at a second preselected hot gas flow condition corresponding to a second engine operating condition, such as with the thrust augmentation system operative. Thus the effective area of the jet nozzle 11 is maintained at the level provided with the sector 15 intact until sustained combustion in the engine afterburner upstream from the jet nozzle is initiated. The increased temperatures and flow velocities resulting from afterburner operation cause disintegration of the mesh or lattic network of the sector 15, resulting in an increase in the effective area of the nozzle. In addition, the initiation of sustained combustion in the afterburner is facilitated by reason of the fact that the nozzle area is restricted to the lower level until sustained afterburner combustion is established, thus allowing higher temperatures and pressures to be built up in the afterburner combustion zone than would be the case if the nozzle area were opened prior to establishment of sustained combustion in the afterburner.

Thus it will be seen that the effective area of the nozzle automatically sequences in steps of preselected magnitudes from a minimum to a maximum in response to the conditions of the fluid flowing through the nozzle. In a typical jet engine application, the inner sector 14 of the flow restrictor 13 may be caused to melt or disintegrate in the general temperature range of 800° F. to 1200° F. at gas flow velocities of 1700 to 2000 ft. per second, these being typical of the conditions encountered under normal operating conditions of a jet engine. The sector 13, on the other hand, may be caused to melt or disintegrate in the temperature range of 2000° F. to 3000° F. at gas flow velocities of about 2300 to 2600 ft. per second, conditions typical of afterburner operation. Typical of materials whose melting points may be changed within these temperature ranges by varying the ratio of elements in their compositions are alloys of aluminum-nickel, aluminum-magnesium, copper-magnesium and copper-manganese.

It will be appreciated that the flow restrictor 13 may include a single sector 15 in the event that only one change in effective area is desired or, on the other hand, it may be formed of more than two sectors to accommodate a desired sequence involving more than two changes in effective nozzle area. It will also be apparent that the configuration of the flow restrictor 13 may be modified from the particular one shown without departing from the scope of my invention and that my invention may be applied to various types of thrust reaction type engines, such as turbojets, rocket and ramjet engines and the like.

From the foregoing, therefore, it will be apparent that various modifications, changes and substitutions may be made in the embodiments presented herein without departing from the true scope and spirit of my invention as defined in the appended claims.

What I claim as new and desire to secure by Letters Patent is:

1. A nozzle for thrust reaction engines of the type having a first operating range of lower-temperature gas flow conditions and a second operating range of higher-temperature gas flow conditions, said nozzle comprising a converging portion, a diverging portion, and a flow restrictor mounted in the gas flow path of the nozzle, said flow restrictor comprising at least two portions, one of said portions being of a configuration and material selected to allow disintegration thereof over said first range of gas flow conditions in said nozzle, and the other of said portions being of a configuration and material selected to allow disintegration thereof over said second range of gas flow conditions in said nozzle, and to withstand said first range of gas flow conditions.

2. A nozzle for thrust reaction engines of the type having a first lower-temperature gas flow operating range and a second higher-temperature gas flow operating range; said nozzle comprising a converging portion, a diverging portion, and a flow restrictor portion mounted in the gas flow path of said nozzle, said flow restrictor portion comprising at least two portions, one of said portions being of a configuration and material selected to disintegrate in said first lower temperature gas flow in said nozzle, and a second of said portions being of a configuration and material selected to withstand said first gas flow and to disintegrate in said second higher temperature gas flow condition in said nozzle.

References Cited in the file of this patent

UNITED STATES PATENTS

| | | |
|---|---|---|
| 2,206,057 | Skinner | July 2, 1940 |
| 2,382,386 | Arms | Aug. 14, 1945 |
| 2,536,231 | Simanton | Jan. 2, 1951 |
| 2,828,602 | Hirsch et al. | Apr. 1, 1958 |
| 2,880,576 | Kappus | Apr. 7, 1959 |
| 2,952,972 | Kimmel | Sept. 20, 1960 |